UNITED STATES PATENT OFFICE.

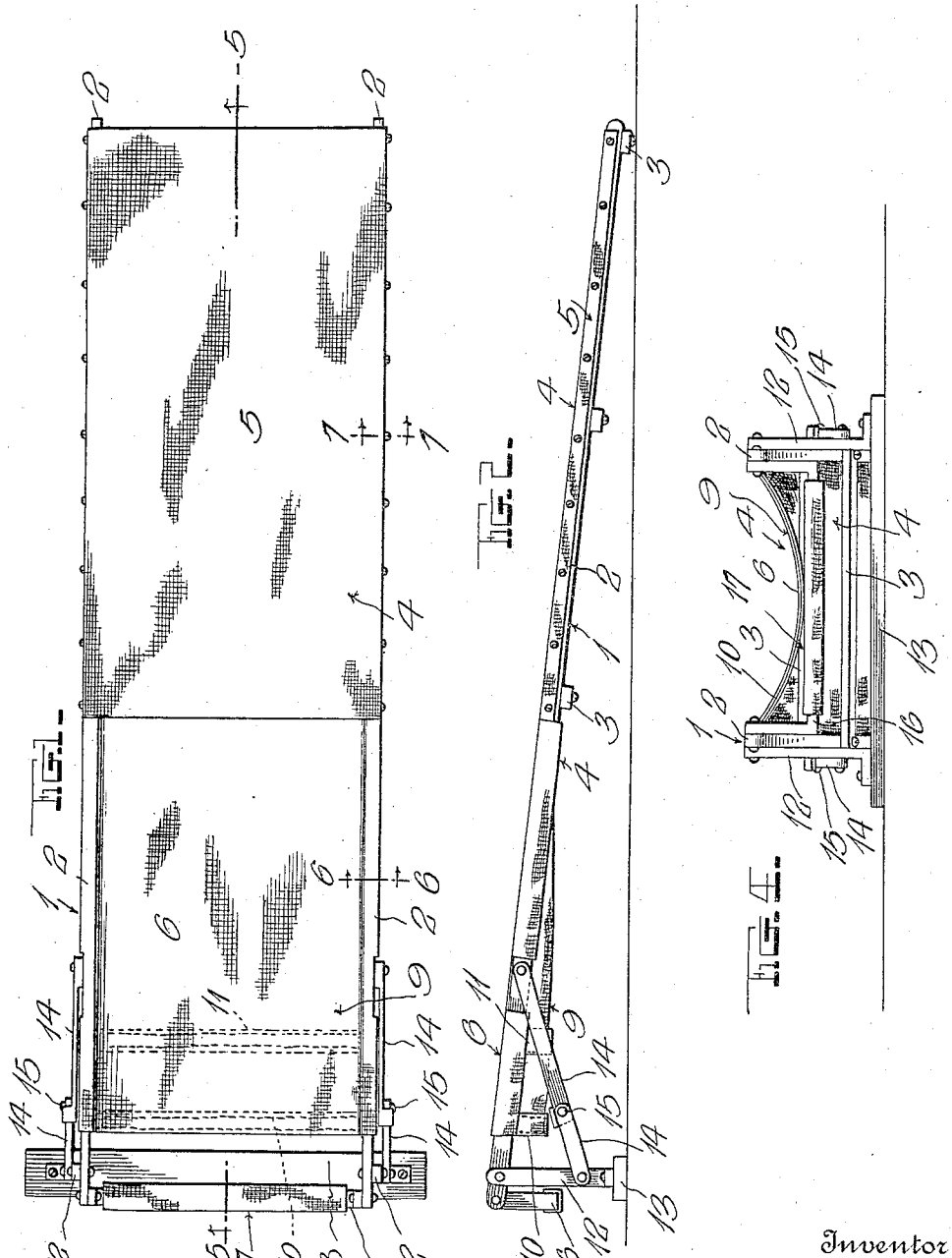

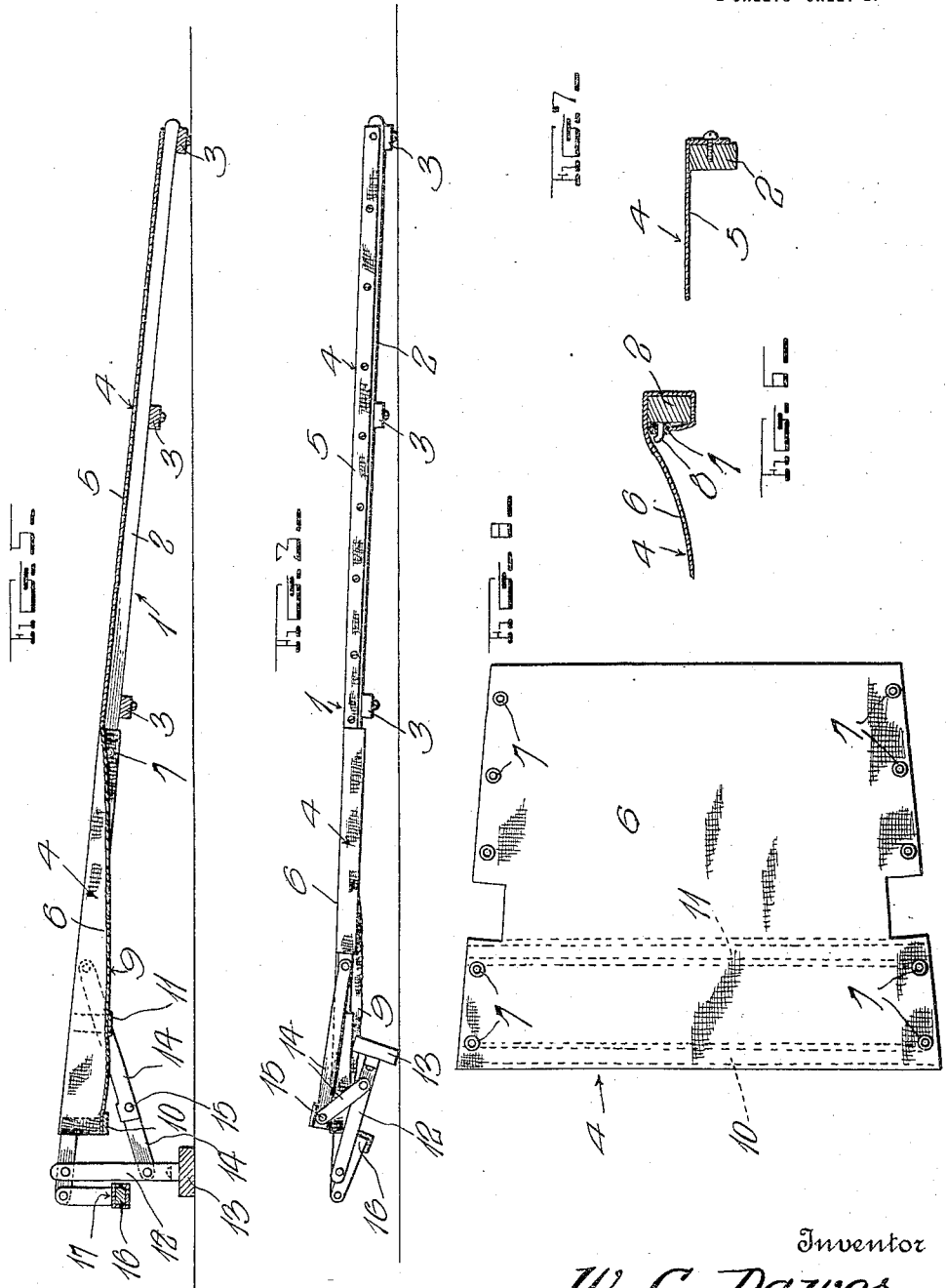

WILLARD C. DAWES, OF BOZEMAN, MONTANA.

INVALID'S SUPPORT.

1,195,917.  Specification of Letters Patent.  Patented Aug. 22, 1916.

Application filed November 11, 1915. Serial No. 60,865.

*To all whom it may concern:*

Be it known that I, WILLARD C. DAWES, a citizen of the United States, residing at Bozeman, in the county of Gallatin and State of Montana, have invented certain new and useful Improvements in Invalids' Supports; and I do declare the following to be a full, clear, and exact description of the invention, such as will enable others skilled in the art to which it appertains to make and use the same.

This invention relates to improvements in body rests or supports especially adapted for use by invalids and the principal object of the same is to provide a device of this character by which the lower portions of the body may be elevated with respect to the head and shoulders.

A further object of my invention is to provide a removable cover for the frame of this support.

With the above and many other objects in view, my invention resides in the novel form of construction, which will be hereinafter more particularly described and shown in the drawings wherein:

Figure 1 represents a top plan view of my device; Fig. 2 is a side elevation thereof with the parts in operative position; Fig. 3 is a similar view showing the movable portions of the device in folded or inactive positions; Fig. 4 is an end view of the parts shown in Fig. 2; Fig. 5 is a central vertical longitudinal section taken on the line 5—5 of Fig. 1; Fig. 6 is a detail longitudinal section taken on the line 6—6 of Fig. 1; Fig. 7 is a similar view taken on the line 7—7 of the same figure; and Fig. 8 is a plan view of the removable portion of the frame cover.

In the accompanying drawing I have shown my invention as comprising a main frame 1 formed of side bars 2 spaced apart and supported by the transverse bars 3, the whole being covered with a suitable flexible material 4, preferably canvas.

The flexible cover 4 is preferably formed in two sections 5 and 6, the main portion 5 thereof being attached to the side bars 2 by any preferred means, while the portion 6 has formed on its longitudinal edges, rows of eyelets 7 which are adapted to coact with the studs 8 formed on the inner edges of the bars 2 adjacent one end of the main frame. This arrangement allows the portion 6 to be readily removed from the frame and cleansed at any time. The portion 6 is allowed to sag adjacent its outer end as shown at 9, the extreme end of this sagged portion being adapted to overlie a flexible band 10 formed preferably of heavy canvas or leather which acts as a reinforcing or supporting strip, but the main portion 5 is held taut between the side bars 2. An additional reinforcing strip 11 is spaced inwardly from the strip 10 a distance about six inches, more or less, the opposite ends of both of these strips being secured to the side bars 2, and have their longitudinal edges stitched to the removable portion 6 so that they may be removed when said portion is removed from the frame. From this description it will be seen that a pocket is provided between the strips 10 and 11, said pocket being adapted to support the hips of the patent lying on the frame.

As it is necessary in treating the pelvic or abdominal organs to have the lower part of the body elevated, I provide the legs 12, one end of each of which is pivoted to the extreme end of each of the side bars 2 adjacent the strip 10, while the lower ends of the legs 12 are secured to a flat support 13 which acts as a firm foundation for the legs when the same are in active position.

Toggle levers 14 pivotally connected as shown at 15 are used as braces to support each of the legs 12, the free ends of the levers 14 being connected to the legs 12 and to the side bars 2, as clearly illustrated in Fig. 2. When it is desired to fold said legs under the frame, the levers 14 are forced inwardly at the pivot point 15, which movement will cause the legs 12 to move upwardly toward the side bars 1 and assume the position shown in Fig. 3. An additional brace bar 16 connects the front ends of the bars 2, and is pivoted thereto to allow the same to fold with the legs 12 beneath the frame, said bar having a depressed central portion 17 in which the legs of the patient rest. This brace bar is preferably padded to prevent injury to the invalid.

In operation, the frame is placed under the patient when it is in the folded position, the patient's hips resting in the pocket formed between the bands 10 and 11, the legs then being extended so as to elevate one end of the frame and raise the lower portions of the invalid's body. When the operation has been performed, the legs may then be folded back and the entire frame removed from underneath the person. If the cover has become soiled during the operation, the removable portion thereof is taken from the frame and washed, after which process, it may be readily replaced in proper position on the end of the frame.

From the foregoing description, it is readily evident that I have produced a very simple foldable support which will be found to be very efficient in operation.

I claim:

In a device of the class described, a main frame, a flexible cover therefor, one portion thereof being removable, said removable portion being sagged, a reinforcing band below said sagged portion and connected to the side bars of said frame, an additional reinforcing band spaced inwardly from the first mentioned band, whereby a hip receiving pocket is formed, a brace bar having a depressed central portion pivotally connected at its opposite ends to the ends of the side bars of said frame adjacent the first mentioned reinforcing band, said bar being foldable beneath the main frame when the device is not in use, and means for elevating one end of said frame, said means being foldable beneath said frame.

In testimony whereof I have hereunto set my hand in presence of two subscribing witnesses.

WILLARD C. DAWES.

Witnesses:
FRANK M. GRAY,
CHARLES B. HEWETT.

Copies of this patent may be obtained for five cents each, by addressing the "Commissioner of Patents, Washington, D. C."